United States Patent
Deeks et al.

(10) Patent No.: US 11,835,037 B2
(45) Date of Patent: Dec. 5, 2023

(54) METHODS AND DEVICES FOR DRIVING A PIEZOELECTRIC PUMP

(71) Applicant: TTP Ventus Ltd., Royston (GB)

(72) Inventors: William Deeks, Royston (GB); Tom Harrison, Royston (GB)

(73) Assignee: TTP VENTUS LTD., Royston (GB)

( * ) Notice: Subject to any disclaimer, the term of this patent is extended or adjusted under 35 U.S.C. 154(b) by 373 days.

(21) Appl. No.: 17/282,279

(22) PCT Filed: Oct. 3, 2019

(86) PCT No.: PCT/GB2019/052789
§ 371 (c)(1),
(2) Date: Apr. 1, 2021

(87) PCT Pub. No.: WO2020/070498
PCT Pub. Date: Apr. 9, 2020

(65) Prior Publication Data
US 2022/0010791 A1 Jan. 13, 2022

(30) Foreign Application Priority Data
Oct. 3, 2018 (GB) ..................................... 1816156

(51) Int. Cl.
*F04B 43/04* (2006.01)
*F04B 49/06* (2006.01)

(52) U.S. Cl.
CPC ............ *F04B 43/046* (2013.01); *F04B 49/06* (2013.01)

(58) Field of Classification Search
CPC .............................. F04B 43/046; F04B 49/06
See application file for complete search history.

(56) References Cited

U.S. PATENT DOCUMENTS 6,309,194 B1  10/2001  Fraser et al.
10,598,192 B2  3/2020  Bukland et al.
(Continued)

FOREIGN PATENT DOCUMENTS

CH    597544 A5   4/1978
CN   2549207 Y   5/2003
(Continued)

OTHER PUBLICATIONS

International Search Report and Written Opinion for International Application No. PCT/GB2019/052789, dated Jan. 3, 2020.
(Continued)

*Primary Examiner* — Connor J Tremarche
(74) *Attorney, Agent, or Firm* — CANTOR COLBURN LLP

(57) ABSTRACT

A voltage driving apparatus for a portable fluid pump comprising a power source arranged to provide a direct current, a DC gain unit electrically connected, in use, to receive a voltage from the power source and output an amplified voltage, and a DC to AC conversion unit arranged, in use, to receive the amplified voltage from the DC gain unit and output a periodic waveform to drive a piezoelectric actuator in the portable fluid pump. The output periodic waveform comprises a first discrete voltage level and a second discrete voltage level. Each period of the waveform comprises the first voltage level for a first length of time and a second voltage level for a second length of time.

19 Claims, 8 Drawing Sheets

(56) References Cited

U.S. PATENT DOCUMENTS

| | | | |
|---|---|---|---|
| 2004/0120836 A1 | 6/2004 | Dai et al. | |
| 2005/0155922 A1* | 7/2005 | Tormaschy | E02B 1/003 |
| | | | 210/241 |
| 2007/0242427 A1 | 10/2007 | Yamamoto et al. | |
| 2007/0272727 A1* | 11/2007 | Yang | H01L 21/6838 |
| | | | 228/101 |
| 2009/0015097 A1 | 1/2009 | Meng et al. | |
| 2009/0243431 A1* | 10/2009 | Ohsawa | F04B 43/046 |
| | | | 310/317 |
| 2010/0290935 A1 | 11/2010 | Richter et al. | |
| 2013/0064683 A1* | 3/2013 | Oshima | F04B 43/046 |
| | | | 417/63 |
| 2015/0008755 A1* | 1/2015 | Sone | H02J 50/80 |
| | | | 307/104 |
| 2015/0267695 A1* | 9/2015 | Marsh | F04B 45/043 |
| | | | 128/205.24 |
| 2017/0266456 A1* | 9/2017 | Piha | A61N 1/0496 |
| 2018/0108825 A1* | 4/2018 | Chen | F04B 49/06 |
| 2020/0332790 A1 | 10/2020 | Tanaka | |
| 2020/0371536 A1 | 11/2020 | Tanaka et al. | |

FOREIGN PATENT DOCUMENTS

| | | |
|---|---|---|
| CN | 1455107 A | 11/2003 |
| CN | 102638166 A | 8/2012 |
| CN | 106787898 A | 5/2017 |
| EP | 042087 A1 | 4/1991 |
| GB | 2576796 A | 3/2020 |
| JP | S57171460 U | 10/1982 |
| JP | 2008002387 A | 1/2008 |
| JP | 2009079482 A | 4/2009 |
| JP | 2014238012 A | 12/2014 |
| WO | WO2006/111775 | 10/2006 |
| WO | WO2009/152775 | 12/2009 |
| WO | WO2010/139917 | 12/2010 |
| WO | WO2010/139918 | 12/2010 |
| WO | WO2012/061044 | 5/2012 |
| WO | WO2013/117945 | 8/2013 |
| WO | WO2013/134056 | 9/2013 |
| WO | WO2015/173280 | 11/2015 |
| WO | WO2018/049060 | 3/2018 |
| WO | WO2020/115502 | 6/2020 |
| WO | WO2020/128426 | 6/2020 |

OTHER PUBLICATIONS

Search Report for GB Application No. GB1816156.2, dated Mar. 29, 2019.
International Search Report and Written Opinion for International Application No. PCT/GB2019/053458, dated Feb. 19, 2020.
Combined Search and Examination Report for GB Application No. GB1820025.3, dated May 14, 2019.
International Search Report and Written Opinion for International Application No. PCT/GB2019/053459, dated Feb. 19, 2020.
Combined Search and Examination Report for GB Application No. GB1900952.1, dated Mar. 27, 2019.
Examination Report for GB Application No. GB1900952.1, dated Nov. 12, 2020.
Combined Search and Examination Report for GB Application No. GB2012420.2, dated Jan. 6, 2021.

* cited by examiner

METHODS AND DEVICES FOR DRIVING A PIEZOELECTRIC PUMP

CROSS-REFERENCE TO RELATED APPLICATIONS

This application is a U.S. national stage filing under 35 U.S.C. § 371 of International Application No. PCT/GB2019/052789, entitled "METHODS AND DEVICES FOR DRIVING A PIEZOELECTRIC PUMP," filed Oct. 3, 2019, which claims priority to GB Application No. 1816156.2, entitled "METHODS AND DEVICES FOR DRIVING A PIEZOELECTRIC PUMP," filed Oct. 3, 2018, both of which are incorporated herein by reference in their entirety for all purposes.

The present invention relates to methods and devices for driving a piezoelectric disc pump.

Recent developments in non-linear acoustics and valve design have allowed the development of compact pumps containing a disc shaped cavity, with the capability of high pressure output and silent operation.

Such a 'disc pump' is well suited to portable applications due to its small size, efficiency and silent operation. The actuator within such a disc pump requires an alternating current (AC) at a drive voltage of several tens of volts peak to peak at maximum power. In order to allow the disc pump to be efficiently utilised in a portable application, it is necessary to provide a compact way of portably providing high voltage AC power to the pump. Batteries are normally used to power portable devices, typically outputting a direct current (DC) at around 3.7 volts (V), so there is a need for drive circuitry for such disc pumps that can employ DC battery sources yet still drive the pump.

Given that the pump must be powered by an AC voltage, there are also a number of options for choosing the driving voltage waveform for the pump. One approach is to configure a drive circuit to output a specific, pre-determined voltage waveform to drive the pump. However, in practice, due to differences resulting from manufacturing, and variations in operational conditions, the resonant frequency of the piezoelectric actuator within a disc pump varies. Using a single pre-determined voltage waveform to drive a disc pump can result in the disc pump not reaching its maximum potential output capabilities. An efficient driving system requires the ability to adjust the characteristics of the AC driving waveform to match the resonant frequency of the piezoelectric actuator within a disc pump, such that the disc pump is most efficiently driven.

Furthermore, a user of such a portable disc pump device expects a control system which allows efficient control of the drive and output parameters, as well as a reliable fault prevention mechanism to avoid overdriving the piezoelectric actuator.

The present invention seeks to address at least some of the above problems.

SUMMARY OF THE INVENTION

According to the present invention, there is provided a voltage driving apparatus for a portable fluid pump, the driving apparatus comprising: a power source, arranged to provide a direct current; a DC gain unit electrically connected, in use, to receive a voltage from the power source and output an amplified voltage; a DC to AC conversion unit arranged, in use, to receive the amplified voltage from the DC gain unit and output a periodic waveform to drive a piezoelectric actuator in the portable fluid pump, the output periodic waveform comprising a first discrete voltage level and a second discrete voltage level, wherein each period of the waveform comprises the first voltage level for a first length of time and a second voltage level for a second length of time.

By having the DC gain circuit which is arranged to receive a direct current voltage and output an amplified voltage it is possible to reliably amplify power from a portable power source up to the power necessary for driving a microfluidic pump. Furthermore, the DC to AC conversion circuit allows the amplified direct current voltage to be converted to an alternating current such that a piezoelectric actuator can be powered. The voltage driving apparatus allows a disc pump to be used in portable applications, while minimising component count. Furthermore, by having a square-like waveform the drive circuit can be more efficient, for example a simple high-side/low-side or bridge arrangement can be driven with the simple square-like waveform directly.

The waveform may be modulated to further comprise in each cycle a third state in which the voltage is at a third voltage level for a third length of time, after the first and second lengths of time. The second voltage level may be higher than the first voltage level, and the third voltage level may be between the first and second voltage levels. Moreover, the third voltage level may be a ground level.

Typically, a ratio of the time spent at each of the first and second voltage levels may be adjusted to produce a waveform having attenuated harmonics. By adjusting the ratio of the times spent at each of the first and second levels, it is possible to attenuate the magnitude of different frequencies and harmonics, further increasing the efficiency with which the piezoelectric actuator is driven. The ratio of each of a plurality of levels may similarly be adjusted to create a range of objective waveforms.

Alternatively, the output waveform may be a pulse-width modulated (PWM) waveform. This can result in a drive waveform which is close to a pure sine wave but which does not contain the harmonic content that is not useful for driving the actuator, leading to further increased efficiency. PWM can advantageously be used to generate complex drive waveforms comprising a plurality of sine wave components having selected frequencies.

Whilst the DC gain unit may comprise any suitable means for amplifying an input direct current voltage, the DC gain unit may comprise one or more of a boost converter, a non-inverting buck/boost converter and an inverting buck/boost converter. Such converters are simple and easily configurable. Preferably, the DC gain unit may further comprise a coupled inductor arranged such that, a first half of the coupled inductor is in series with the power source and a switching element and a second half of the coupled inductor is in series with a diode, which may be a Schottky diode and the output of the DC gain unit. By using a coupled inductor it is possible to provide a DC gain unit which can withstand the high voltages necessary for driving the piezoelectric actuator.

Typically, the DC gain unit may be arranged to receive an input from a microcomputer unit to control the output voltage from the DC gain unit.

The DC to AC conversion unit may comprise an operational amplifier in a non-inverting amplifier configuration arranged to output an alternating current waveform. Operational amplifiers are cheap, reliable and easily replaceable. Typically however, the DC to AC conversion unit may comprise a half-bridge arranged, in use, to switch between two voltages to output an alternating current. Alternatively, the DC to AC conversion unit may comprise an H-bridge, arranged to output an alternating current voltage with twice the voltage supplied to the DC to AC conversion unit. By using a half-bridge or an H-bridge, it is possible to provide an alternating current voltage while significantly reducing the power wasted from the input direct current. Whilst any suitable component can be used as switching elements in the half bridge or H-bridge, typically the DC to AC conversion unit may comprise MOSFETs, arranged to act as switching elements within the half-bridge or H-bridge.

The apparatus may further comprise a direct current blocking circuit, comprising a blocking capacitance, arranged in use to filter out any direct current component of the output waveform. The apparatus may also comprise a filter inductor, arranged in use to filter out high frequency content in the output waveform.

In some instances, it can be useful to limit the power used to drive the piezoelectric actuator in a pump. The apparatus may further comprise a power control unit arranged, in use, to periodically calculate an impedance of the fluid pump, and selectively adjust the output waveform. The power control unit may be further arranged to calculate a first voltage required to drive the fluid pump at a selected first power. The selected first power may be a desired set power and a driving voltage of the waveform may be set equal to the first voltage. Alternatively, the selected first power may be a maximum desired power, and a driving voltage of the waveform may be set equal to or less than the first voltage.

The power control unit may be further arranged to calculate a second voltage required to drive the pump at a selected second power, wherein the second power is a maximum desired power, and the driving voltage, calculated in response to the first power and first voltage, is modified to be equal to or less than the first voltage.

The power control unit may be arranged to periodically calculate the impedance of the fluid pump with a period of between about 100 microseconds and about 1 minute.

BRIEF DESCRIPTION OF THE DRAWINGS

The invention will now be described by way of example with reference to the accompanying drawings, in which.

DETAILED DESCRIPTION

Figure 1:
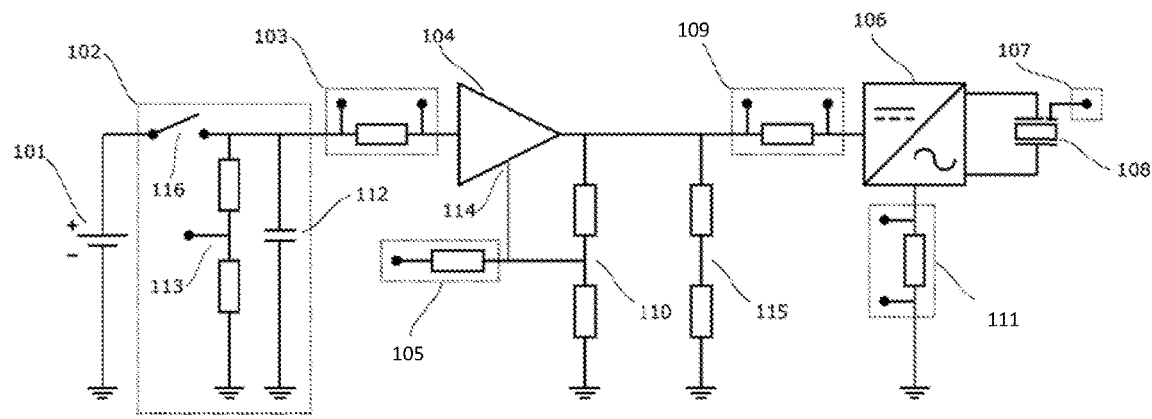
FIG. 1 schematically illustrates an overview of the circuitry used to drive a piezoelectric actuator according to an example of the present invention.

FIG. 1 schematically illustrates an example circuit 100 used to drive a piezoelectric actuator in a potable pump according to an example of the present invention, with several optional additions for measurement and control purposes.

The circuit 100 includes a battery 101 grounded at one end and connected at the other end to the input of a DC gain section 104 through an input measurement circuit 102 and a first shunt resistor 103. A first resistor divider 110 is connected between the output of the DC gain section 104 and ground. The centre of the first resistor divider 110 is connected back to a feedback pin 114 of the DC gain section 104. A second shunt resistor 105 is placed between the centre of the first resistor divider 110 and the feedback pin 114. A second resistor divider 115 is connected between the output of the DC gain section 104 and ground, where the centre of the second resistor divider is arranged to be connected to an analogue-to-digital converter (ADC, not shown). The drive circuit further comprises a DC-to-AC conversion circuit 106. The input of the DC-to-AC conversion circuit 106 is connected to the output of the DC gain section 104 through a third shunt resistor 109. A fourth shunt resistor 111 is connected between ground and the DC-to-AC conversion circuit 106. The output of the DC-to-AC conversion circuit is connected to a piezoelectric disc pump 108. In particular, the output of the DC-to-AC conversion circuit 106 is used to drive the piezoelectric actuator 108*a* (not shown) within the disc pump 108. As described below, a small section 107 of the piezoelectric device 108 is disconnected from the driven elements and is arranged to be connected to an ADC input for sensing.

The input measurement circuit 102 includes a switching element 116 connected between the input and output of the input measurement circuit 102. The input measurement circuit further comprises a resistor divider 113 connected between ground and the output end of the switching element 116. The centre of the resistor divider 113 is arranged to be connected to an ADC (not shown). A capacitor 112 is also connected between ground and the output end of the switching element 116. The input measurement circuit 102 can be used to measure the power input into the DC gain section 104, and operates in two stages. In the first stage, the switching element 116 is opened for a predefined period. After this period, the voltage across the capacitor 112 will have dropped, proportionally to the current that has flown into the DC gain section 104. The resistor divider 113 scales the voltage over the capacitor 112 so that it can be read by an ADC, allowing the voltage drop to be measured by a microcontroller unit (MCU). This allows the current consumption from the DC gain section 104 to be calculated. The switching element 116 can then be closed again to charge up the capacitor 112 and to allow the downstream circuitry to continue to operate.

The impedance of the piezoelectric actuator within a disc pump varies between units, due to manufacturing conditions. Furthermore, the impedance of a piezoelectric device depends on various environmental factors such as temperature. As such, it is useful to be able to measure both the voltage and current with which the piezoelectric device is driven in order for the power into the piezoelectric actuator to be calculated. The current can be measured by placing a shunt resistor in the drive circuit.

The example shown in FIG. 1 illustrates the various different positions a shunt resistor can be placed in order to measure the current into the piezoelectric device. The first shunt resistor 103 placed before the DC gain section 104 measures the current into the DC gain section 104. By considering the DC gain and efficiency, the current out of the DC gain section 104 can also be calculated. The third shunt resistor 109 placed between the DC gain section 104 and DC-to-AC circuit 106 can be used along with a different amplifier to amplify the voltage across the resistor to measure the current through the resistor. The fourth shunt resistor 111 connected between ground and the output of the DC to AC circuit measures the drive current to the piezoelectric device.

The resistor divider 110 can be used, along with the second shunt resistor 105 if included, to calculate the necessary output voltage to achieve the feedback voltage at the feedback pin 114. This allows the voltage to the piezoelectric device 108 to be calculated.

In some cases the DC gain section 104 takes significant time to reach the target output voltage. As such, it can be beneficial to measure the output voltage from the DC gain section 104 directly. By connecting an ADC to the centre of the second resistor divider 115, the output voltage can be directly inferred from the voltage measured at the ADC at the centre of the resistor divider 115.

The motion of the piezoelectric device 108 can be directly measured to calculate its actual velocity and to determine which drive frequency gives the highest velocity. A section of the piezoelectric device, disconnected from the driven elements, can be used to sense the strain the piezoelectric actuator is under. The output voltage from the piezoelectric section is proportional to the displacement. The output 107 from the piezoelectric section can be connected to an ADC input for sensing, or first scaled with a voltage divider, or op-amp circuit.

As indicated in FIG. 1 by the broken lines, the input measurement circuit 102, first shunt resistor 103, second shunt resistor 105, third shunt resistor 109 and fourth shunt resistor 111 are optional.

Figure 8:
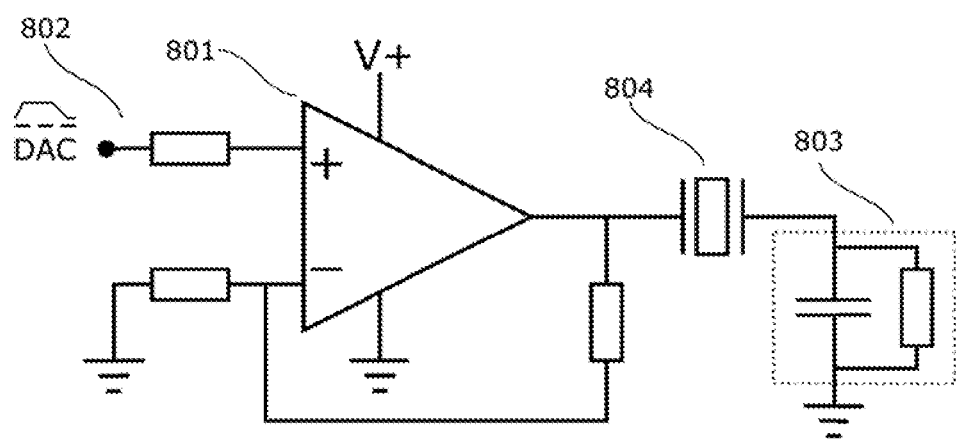
FIG. 8 schematically illustrates an operational amplifier arranged to drive a piezoelectric actuator, according to an example of the present invention.

FIG. 8 illustrates an example of an op-amp circuit 800 shown in a non-inverting amplifier configuration, arranged to drive a piezoelectric disc pump 805. The circuit 800 comprises an op-amp 801 in a non-inverting amplifier configuration. A DAC output 802 from an MCU is connected through a resistance 804 to the op-amp 801. With sufficient voltage and current output capability, the op-amp 801 can be used to drive the piezoelectric actuator in a disc pump 805.

In order to efficiently drive the piezo, the output of the DAC should be an AC waveform. The circuit 800 further comprises an optional DC blocking circuit 803 in series with the piezoelectric pump. The blocking circuit 803 comprises a capacitance and a resistance between the pump and ground, and is used to block the DC component of the drive waveform.

Figure 2:
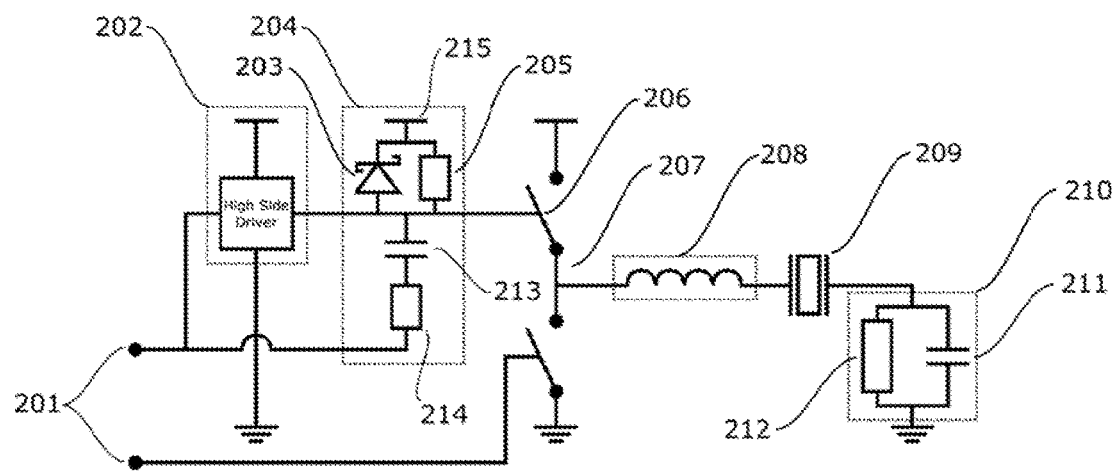
FIG. 2 schematically illustrates a portion of an example driving circuit comprising a half-bridge.

One disadvantage of using an op-amp to drive the piezoelectric actuator with an AC waveform is that it can waste a significant amount of the input power (typically over half). Alternatively, a half-bridge can be used to drive the piezoelectric actuator. FIG. 2 illustrates an example of a half-bridge drive circuit 200, arranged to drive a piezoelectric disc pump 209. The circuit 200 includes a half-bridge 206 connected between an input 201 and a piezoelectric disc pump 209. The half-bridge 206 comprises a first switching element 206a and a second switching element 206b. The half-bridge 206 is used to switch the output between two voltages. In this example, the half-bridge 206 is arranged to switch the output between ground and the drive voltage. An AC output can be produced by alternating the half-bridge output between the two voltages.

The circuit 200 further comprises an optional inductor 208 placed in series with the piezoelectric actuator 209. The inductor 208 filters out high frequency content in the drive waveform generated by the half-bridge 206. Additionally, the circuit 200 comprises an optional DC blocking circuit 210 connected in series with the piezoelectric actuator 209. The DC blocking circuit 210 comprises a capacitance 211 and a resistance 212 between the pump and ground, and the blocking circuit 210 is used to block the DC component of the waveform from the half-bridge 206.

The first and second switching elements 206a,b may comprise MOSFET switches. As the absolute DC gate voltage required to switch a MOSFET is often outside the range of capability of a typical MCU GPIO pin, a high side driver 202 can be added between the MOSFET gate and an MCU GPIO pin, to buffer and amplify the signal from the GPIO in to the MOSFET gate, as shown in FIG. 2. When alternating which switching element is closed, a transition period may be introduced between the control signal to open one switch and close the other. This transition period ensures that both switching elements are never simultaneously in the closed position, even for a brief instant.

The example circuit 200 also includes a release circuit 204. The half-bridge 206 is coupled to a GPIO pin through the release circuit 204. In the case that the switching elements 206a,b comprise MOSFET switches, the gate of either or both of the MOSFET switches are coupled to the GPIO pin through the release circuit 204. In this example, the release circuit comprises a Schottky diode 203, a first resistor 205, a capacitor 213 and an optional second resistor 214. The release circuit 204 may be included in combination with or instead of the high side driver 202. The AC output of the GPIO pin is coupled to the MOSFET gate 206a through the capacitor 213 of the release circuit 204, whilst blocking the DC component. The resistor 205 pulls the DC bias voltage at the MOSFET gate 206a towards the voltage supplied to the half-bridge 207.

The Schottky diode 203 at the MOSFET gate 206a limits the gate voltage, forcing one end of the AC voltage swing to the supplied voltage, rather than allowing the AC voltage to swing equidistant around the supplied voltage. In use, this turns the MOSFET on more aggressively. The optional resistor 214 limits the peak current to or from the GPIO pin, protecting it from damage due to over current.

Diode 203 is shown and described as a Schottky diode throughout. Any reasonable diode or other high frequency rectifying device can be used as diode 203, however a Schottky diode is preferred due to its high switching speed and low forward voltage drop.

In use, the release circuit 204 ensures that the supplied voltage does not ramp too quickly, as the gate voltage may lag too far behind the supplied voltage causing the MOSFET to switch on or off unintentionally. The degree of lag is dependent on the resistor 205. Replacing the resistor 205 with a carefully chosen Zener diode, where the Zener voltage is slightly above the peak-to-peak AC swing at the MOSFET gate, allows the supplied voltage to be ramped faster.

Figure 3:
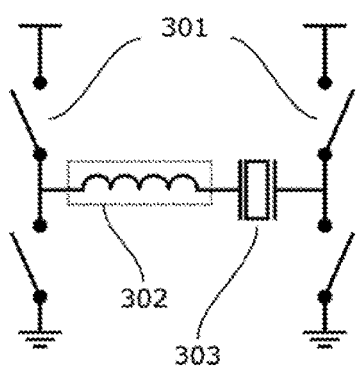
FIG. 3 schematically illustrates an example H-bridge arranged to drive a piezoelectric actuator.

FIG. 3 illustrates an example of an H-bridge system 300 driving a piezoelectric device. The H-bridge 300 comprises four switching elements 301 and a piezoelectric device 302. In this example, the H-bridge further comprises an inductor 303 placed in series with the piezoelectric device 302 to filter out high frequency content in the waveform generated by the H-bridge.

The H-bridge of FIG. 3 can be used with known drive schemes, however the driving schemes described in conjunction with FIG. 2 can advantageously be applied to some or all of the switches in FIG. 3 and accompanying description.

Each of the switching elements 301 may comprise one or more MOSFETs. Since the absolute DC gate voltage required to switch a MOSFET is often outside the range of a typical MCU GPIO pins capabilities, a high side driver (not shown in FIG. 3) can be added between the MOSFET gate and an MCU GPIO pin to buffer and amplify the signal from the GPIO pin to the MOSFET gate.

The DC gain circuit must generate a voltage equal to the peak-to-peak voltage used to drive the piezoelectric device. Most DC gain circuits are more efficient at lower gains, and as such it is beneficial to reduce the necessary output voltage from the DC gain circuit. An H-bridge can be used to drive the piezoelectric device, with a peak-to-peak AC voltage equal to twice the supplied voltage to the H-bridge.

Figure 4:
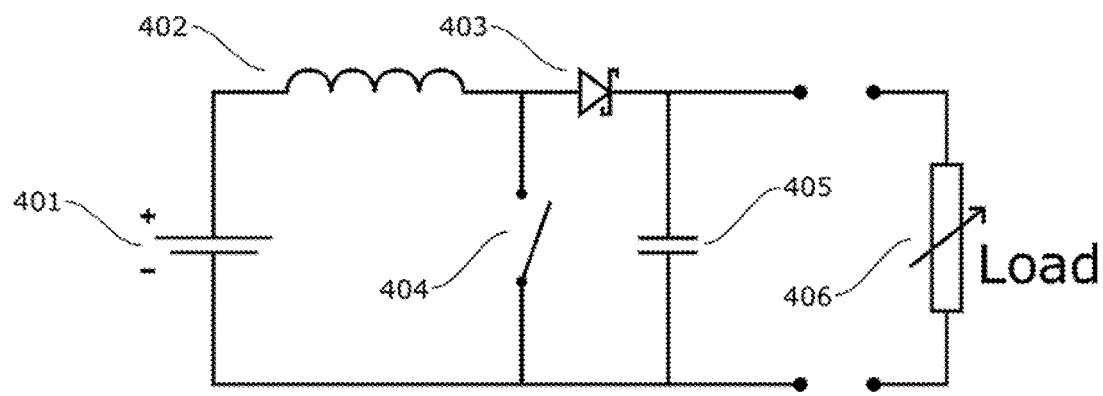
FIG. 4 schematically illustrates a boost converter according to an example of the present invention.

FIG. 4 schematically illustrates a boost converter circuit 400 which allows a supply voltage to be converted to a higher voltage with good efficiency (over 90% with careful design). The boost converter circuit 400 comprises a battery 401, inductor 402, diode 403, switching element 404, capacitor 405 and load 406. The battery 401 is connected to the inductor 402 which is connected back to the battery 401 through the switching element 404. The inductor 402 is also connected through the diode 403 to the capacitor 405 and the load 406, which both connect back to the battery.

The boost converter 400 shown in FIG. 4 operates by switching between two states. In a first state, the switching element 404 is closed. In the first state, the current flow through the inductor 402 increases and the load runs from the charge stored on the output capacitor 405. In a second state, the switching element 404 is opened. In the second state, the inductors 402 tendency to resist change in flow, maintains the current towards the load, which drops as the magnetic field around the inductor 402 collapses. As the current from the inductor flows through the diode 403, the output capacitor 405 is charged. If the switch 404 is cycled fast enough, the output capacitor 405 does not discharge down to the battery 401 voltage between the first and second states, resulting in an output voltage higher, typically significantly higher, than the battery 401 voltage. The amount of power delivered to the output is governed by the duty cycle of the switching element 404.

Figure 5:
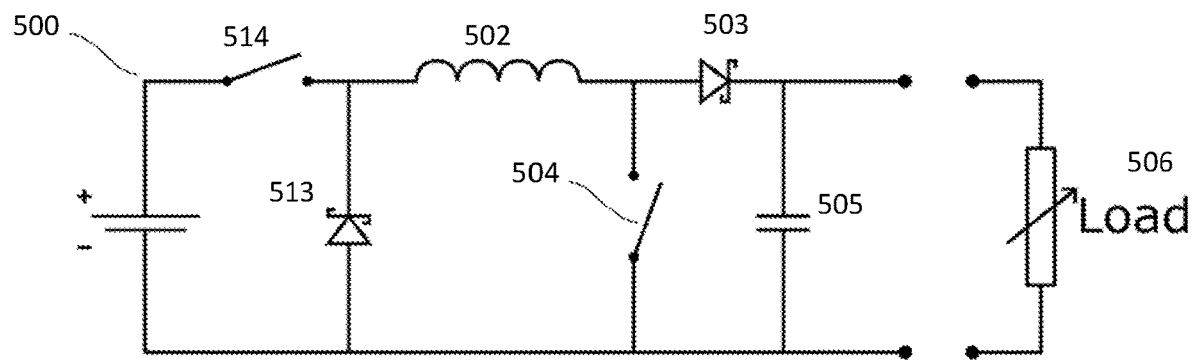
FIG. 5 schematically illustrates a non-inverting buck/boost converter according to an example of the present invention.

One limitation of a boost converter such as the one illustrated in FIG. 4 is the inability to produce an output voltage below the supply voltage (less the voltage drop across the diode 403). In some applications, it is necessary to drive a disc pump at very low power, which may require a drive voltage below the supply voltage. A buck/boost conversion circuit can provide an output voltage both higher and lower than the supply voltage. An example buck/boost conversion circuit is illustrated in FIG. 5.

The buck/boost conversion circuit 500 comprises a battery 501, an inductor 502, a first diode 503, a second diode 513, a first switching element 504, a second switching element 514, a capacitor 505 and a load 506. In the example shown, the battery is connected through the second switching element 514 to the inductor 502. The inductor is connected through the first diode to the load and the capacitor, which both connect back to the battery. The inductor is also connected through the first switching element to the second diode 513 and back to the battery.

Figure 6:
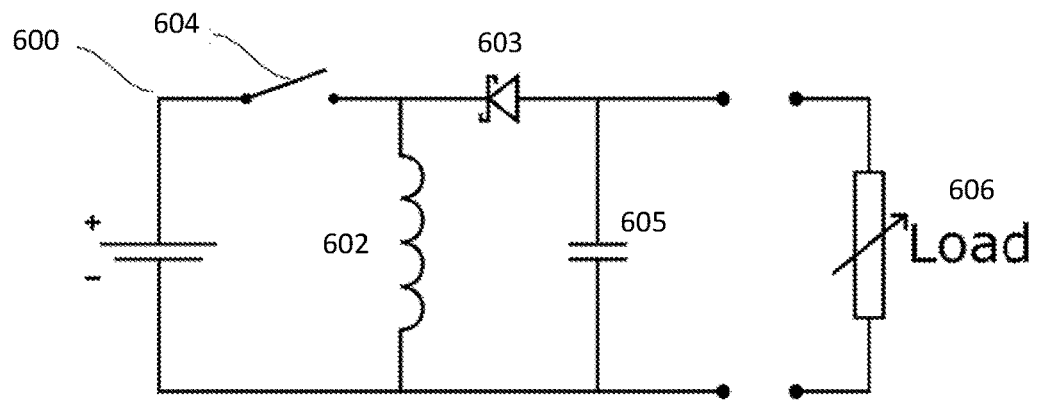
FIG. 6 schematically illustrates an inverting buck/boost converter according to an example of the present invention.

One drawback of the buck/boost converter is the need for two switching elements and two diodes. In addition, the controlling circuitry or software must determine when to transition from buck to boost mode, and vice versa. Both of these increase the cost to produce a buck/boost converter. An inverting buck/boost conversion circuit, schematically illustrated in FIG. 6, can produce an output voltage which is the inverse of the supply voltage.

Similar to the boost converter 400, the inverting buck/boost converter 600 comprises a battery 601, inductor 602, diode 603, switching element 604, capacitor 605 and load 606. Compared with the boost converter 400, the inductor and switching element are swapped in position. The battery 601 is therefore connected to the switching element 604 which is connected back to the battery 601 through the inductor 602. The switching element 604 is also connected through the diode 603, which is reversed in polarity compared with the boost converter 400 of FIG. 4, to the capacitor 605 and the load 606, which both connect back to the battery.

The magnitude of the output voltage can be above or below the supply voltage, and only a single diode and switching element are needed (compared to the non-inverting buck/boost converter 500). If the downstream circuitry can operate from an inverted supply, the inverting buck/boost converter is preferred over the non-inverting variant due to its simpler circuitry.

The boost, buck/boost and inverting buck/boost converter circuits all share a limitation where the switching element used (switching elements 404, 504 and 604 respectively) when boosting the output voltage must be able to withstand the output voltage. Several off the shelf converter integrated circuits (ICs) contain internal switches which cannot withstand the output voltage required by the piezoelectric actuator inside a disc pump.

Figure 7:
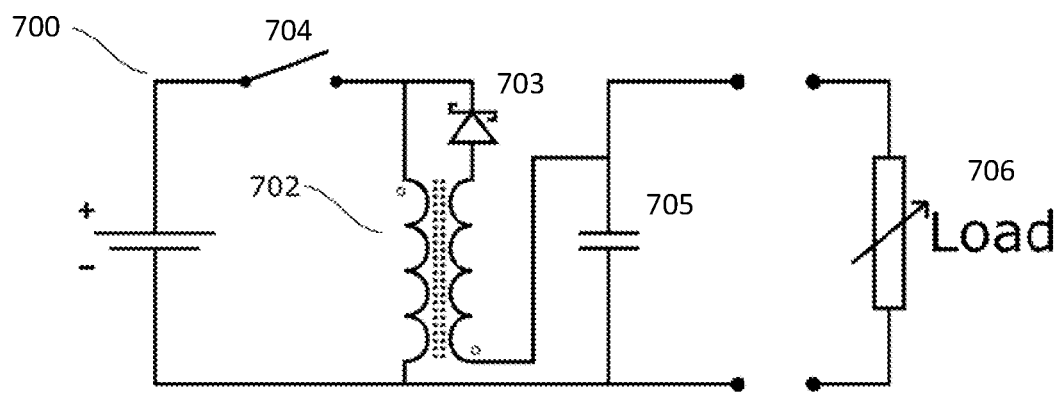
FIG. 7 schematically illustrates a non-inverting buck/boost converter comprising a coupled inductor modification, according to an example of the present invention.

Each converter's circuitry can be modified by exchanging the inductor with a coupled inductor, as illustrated by the example circuit in FIG. 7. The non-inverting buck/boost converter 700 comprises a battery 701, a coupled inductor, a diode 703, a switching element 704, a capacitor 705 and a load 706. The battery is connected through the switching element 704 to a first half 702a of the coupled inductor, and back to the battery. The second half 702b of the coupled inductor is connected to the switching element 704 through the diode 703, to the capacitor 705 and to the load 706. Importantly, the second half 702b of the coupled inductor 702 is in series with the current path when the switching element 704 is open. In this configuration, the voltage magnitude at the switching element 704 is a function of the 'turns ratio' of the coupled inductor 704. The turns ratio is the ratio of the notional number of turns in the first half of the coupled inductor compared with the notional number of turns in the second half of the coupled inductor. For example, a coupled inductor with a turns ratio of 1:3 in an inverting buck/boost converter 700 with an output voltage of 40 volts would have a peak voltage of −10 volts at the switching element 704.

Most DC gain circuit controllers (such as boost, buck/boost and inverting buck/boost) have a feedback pin 114, where the output voltage is adjusted to maintain a specific voltage at the feedback pin. Typically, the output voltage is scaled down using a resistor divider 110 before it is connected to the feedback pin 114, as shown in FIG. 1. A digital-to-analogue converter (DAC) can be connected to the feedback pin 114 through a resistor 111, allowing current to be injected into the resistor network, therefore adjusting the necessary output voltage to achieve the specified feedback pin voltage. This allows an MCU with a DAC to control the output voltage from a DC gain circuit.

Figure 9:
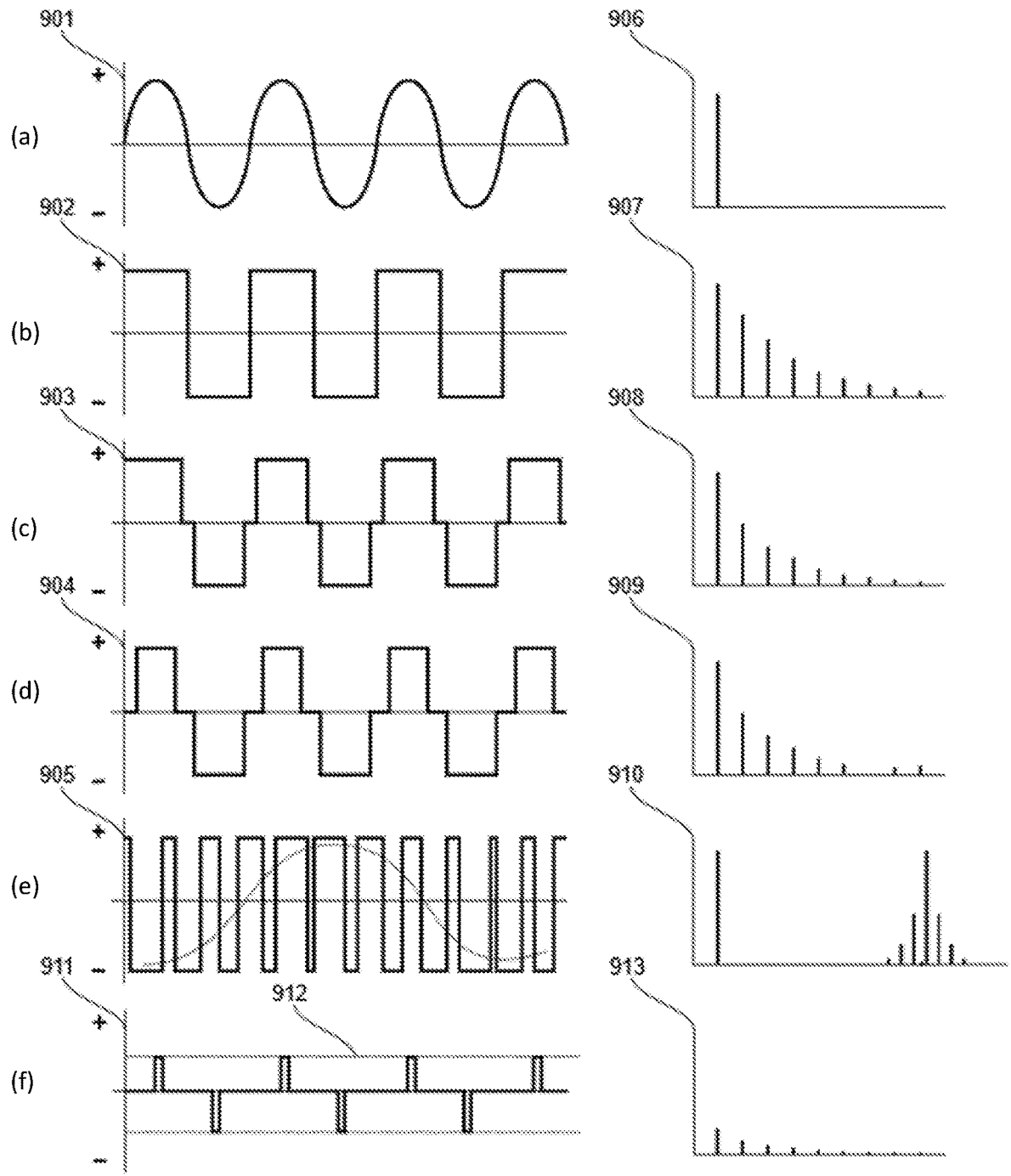
FIG. 9 schematically illustrates various possible drive waveforms for driving a piezoelectric actuator, according to an example of the present invention.

The graphs in FIG. 9 illustrate the various different possible drive waveforms along with the frequency content of each waveform.

The pure sine wave 901 in FIG. 9(a) illustrates the result of using a power op-amp to generate a signal of a single frequency. A piezoelectric system has multiple resonant frequencies. However, the piezoelectric within a disc pump has one resonant frequency which produces useful output. Power driven into the other resonant frequencies is therefore wasted. In theory, the most efficient waveform to drive the piezoelectric actuator is a pure sine wave 901 at the useful resonant frequency as it only contains one frequency 906 and the wasted power is minimised. A pure sine wave 901 can be generated by buffering a DAC output 802 with a power operational amplifier 801.

The efficiency when generating a pure sine wave with a power op-amp is typically under 50%. Alternatively, as shown in FIG. 9(b), the piezoelectric actuator can be driven with a square wave 902 at the useful resonant frequency. The square wave can be generated with a half-bridge 207 or an H-bridge 301, where the efficiency to generate the square wave is typically over 95%. However, the square wave output 902 contains integer harmonics 907 of the fundamental frequency. The harmonic content 907 in the square wave 902 can drive power into the harmonics of the piezoelectric actuator which produce no useful output in a disc pump, which reduces the overall output efficiency.

FIG. 9(c) shows a modified square wave 903 which has a third state at ground, making the waveform more sine wave-like and reducing the magnitude of the generated harmonics 908. This can be achieved by generating a tristate waveform using an H-bridge 301. This in turn increases the overall efficiency as less power is driven into the unused harmonics in the piezoelectric actuator within a disc pump.

In the waveform shown in FIG. 9(d), the tristate waveform of FIG. 9(c) is further modified by changing the mark space ratio between the time at the low and high voltages to produce a waveform 904 in which the magnitudes of different harmonics 909 are attenuated. This can be useful as specific piezoelectric harmonics may have very low impedances, and it's beneficial to further attenuate any drive frequency content at these harmonics. In a specific example such as the one illustrated in FIG. 9(d), the signal power in the 7th harmonic is reduced to almost zero by setting the mark space ratio to 44:56 and the time spent at ground for each phase of the third state to approximately 3 microseconds. For the avoidance of doubt, this gives 6 microseconds at the third state during each waveform period.

In some cases, the harmonic content of a modified waveform according to any of FIGS. 9(a)-9(d) may still drive more power into unwanted piezoelectric harmonics than is desirable. FIG. 9(e) illustrates an example pulsed waveform 905 comprising a set of harmonics 910. The pulsed waveform 905, which in some examples may be a pulse-width modulated (PWM) waveform, can contain the drive frequency of the piezoelectric actuator by modulating the pulse width, where the width or duty cycle tracks the value of the desired drive waveform. The high frequency content can then be easily filtered out with a passive low pass filter, which could be implemented with an inductor (circuits 208 and 302). This results in a drive waveform over the piezoelectric actuator, which is close to a pure sine wave, with very little harmonic content.

As previously discussed, one limitation of a boost converter such as the one illustrated in FIG. 4 is the inability to produce an output voltage below the supply voltage (less the voltage drop across the diode 403), which effectively imposes a minimum drive power that can be delivered to the pump. Yet, in some applications, it is necessary to drive a disc pump at very low power. One method of circumventing this limitation is to use pulse width modulation. FIG. 9(e) shows a further modification to the waveform shown in FIG. 9(d) where the peak voltage 912 is reduced to the minimum output voltage of the boost converter (or other DC gain stage with similar minimum voltage limitation) and the time spent at ground is increased, reducing the pulse width of the peaks and troughs of the waveform. This has the effect of reducing the power delivered to the pump 912 had the pulse width not been reduced. Pulse width modulation therefore provides a mechanism for adjusting drive power independently of voltage amplitude, circumventing the minimum voltage limitation of the boost converter.

Figure 10:
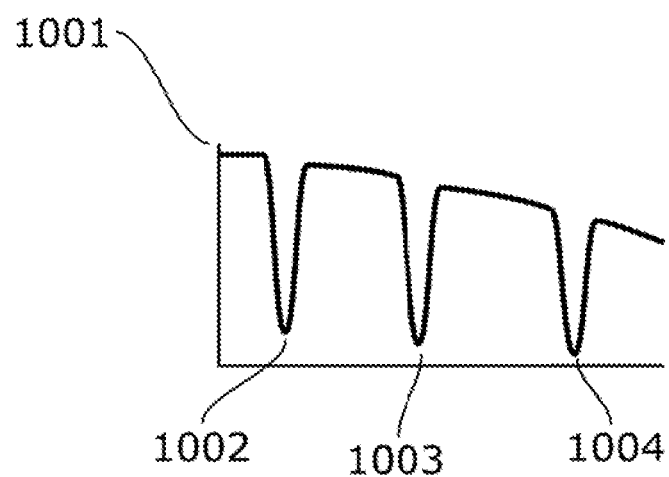
FIG. 10 schematically illustrates an impedance-frequency graph of a typical piezoelectric actuator.

Before driving the piezoelectric device inside a disc pump, the frequency of the useful piezoelectric resonance must be found. The impedance at the resonant frequency is much lower than at off-resonance, and so the actuator requires a lower voltage to drive it at a specific frequency, which is advantageous. FIG. 10 illustrates an example of an impedance-frequency curve 1000 of a typical piezoelectric device. The curve 1000 shows the impedance generally decreasing with increasing frequency, with several narrow dips 1002, 1003, 1004 which line up with the resonant modes. The resonant modes of a piezoelectric actuator are typically far enough apart and vary sufficiently little from one actuator to another that they occupy known frequency bands, which do not overlap. Therefore, to find the resonant frequency of a specific mode, the piezoelectric actuator can be driven through the frequency range that mode is known to be found in at constant voltage, and the point where the maximum current is consumed indicates the frequency of the specific resonant mode. In one example where the useful resonant mode is between 20 kHz and 22 kHz, the actuator is driven in steps of 20 Hz from 20 kHz to 22 kHz, and a pause of 10 ms is made at each step. The pause gives the actuator time to respond to changes in the driving frequency, such that its own oscillation frequency is similar to the driving frequency. At the end of the pause the current is measured. The step with the higher current consumption indicates the position of the resonant modes frequency to within 20 Hz.

Figure 12:
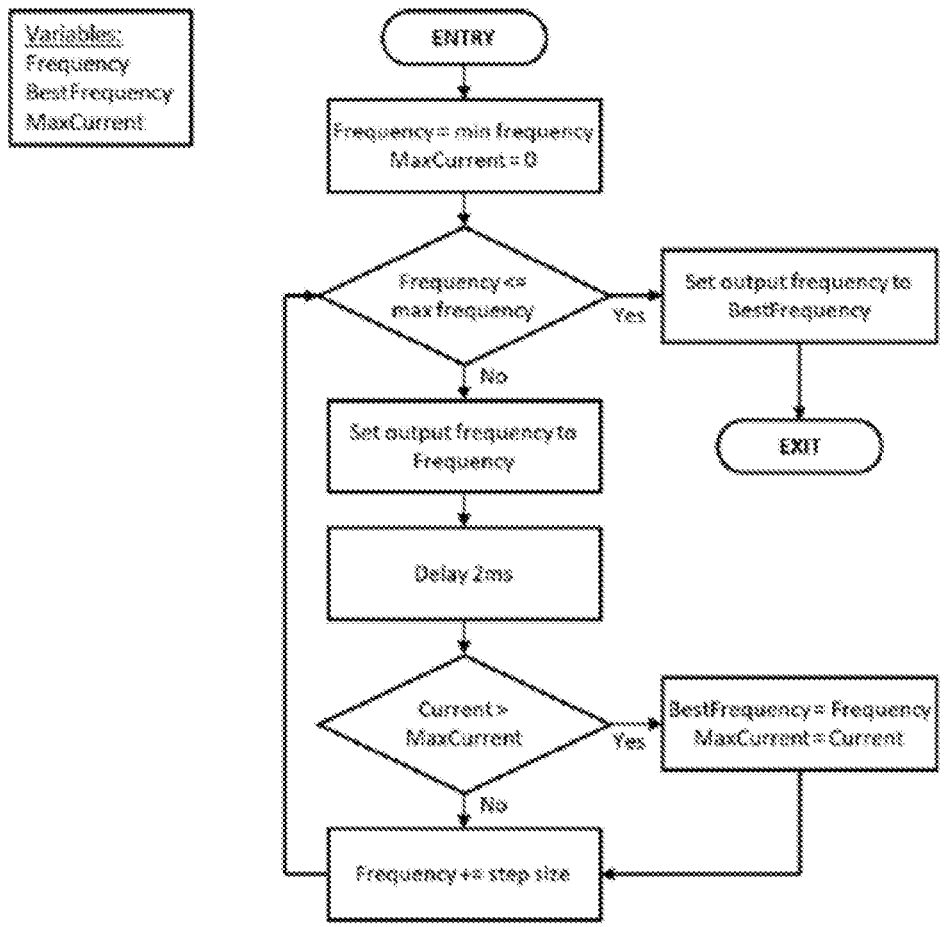
FIG. 12 schematically illustrates an example frequency selection method.

The step size and pause length are not universal: for a given design of piezoelectric device, each can be optimised. The pause length should be set such that the actuator has sufficient time to respond to changes in the driving frequency. The step size should be small enough that the trough of the narrow dips 1002, 1003, 1004 can be well resolved across adjacent steps, yet large enough that differences in measured current are observed between adjacent steps at frequencies where the impedance change with frequency is lower. Further the frequency step size may not be fixed in frequency, but instead result from a fixed period as measured by a counter in the microprocessor. An example of frequency selection algorithm is shown in FIG. 12.

Figure 13A:
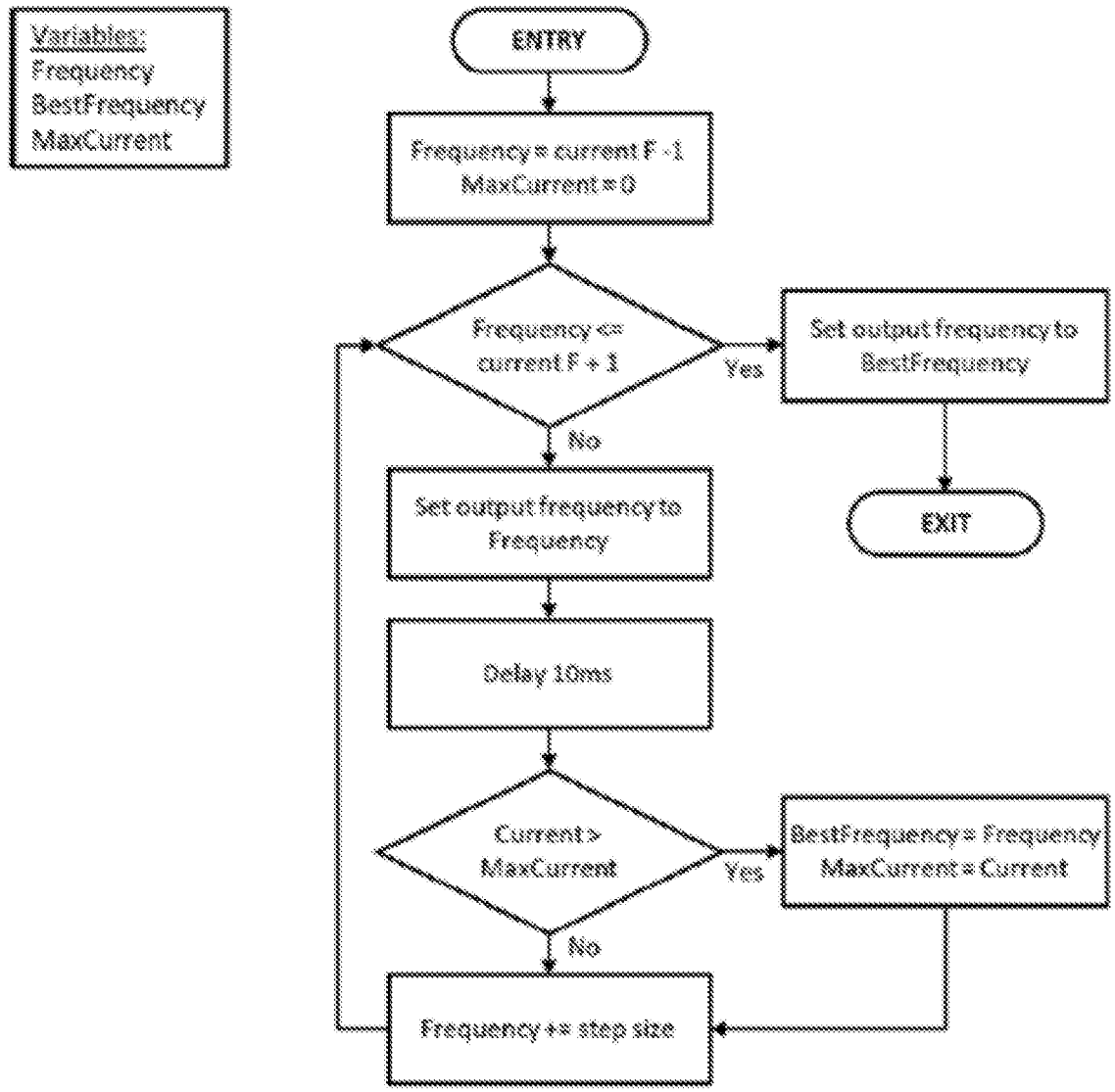
FIGS. 13(*a*) and 13(*b*) schematically illustrate example frequency tracking methods.
Figure 13B:
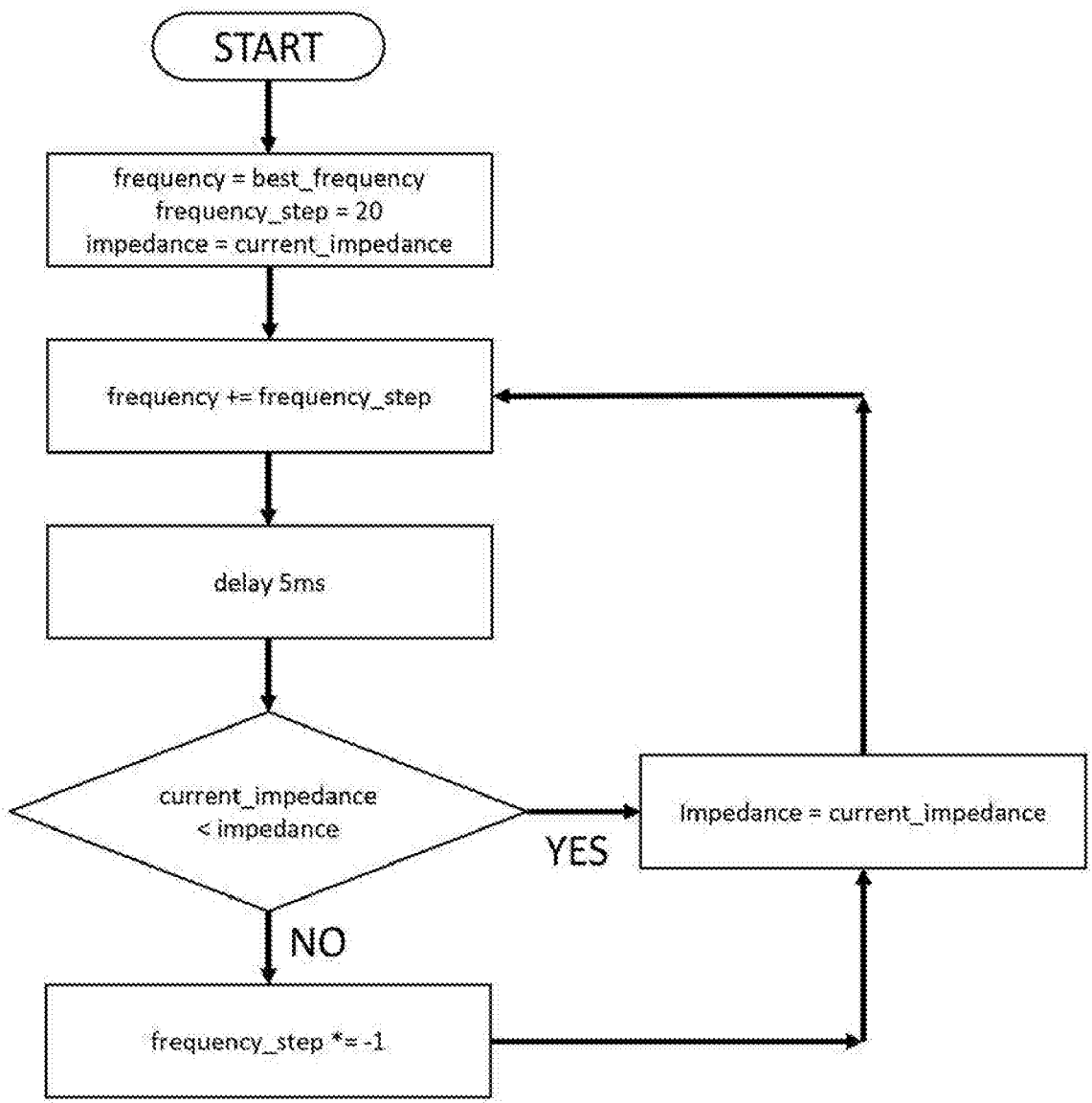

The frequency of the resonant modes within a piezoelectric actuator vary with temperature, loading, drive power, and other external factors. It can often be beneficial to drive the actuator with a frequency that matches the useful resonant mode. For this, the frequency of the resonant mode must be tracked. To track the frequency of the resonant mode, the drive frequency should be periodically shifted up, and then down around the nominal drive frequency, by a small frequency step, such as 20 Hz. The impedance at each step is calculated from the measured voltage and current consumption. The frequency with the lower impedance is selected as the new nominal frequency, and the tracking process repeats. Alternatively, at each step the current is measured. The frequency with the highest current consumption is selected as the new nominal frequency, and the tracking process repeats. Two examples of frequency tracking algorithms are shown in FIGS. 13(a) and 13(b).

Selecting and tracking frequency by minimising measured impedance or maximising measured current consumption proves to be an effective way to drive a piezoelectric pump at its resonance. There are alternative approaches that can be employed, particularly where the output of the pump can be measured. For example, if one or more of the flow rate, pressure or vacuum generated by the pump can be measured during operation, then the relationship between one or more of these parameters and the pump drive frequency can be used to select and track the nominal drive frequency. This enables the optimisation of frequency based on maximising the output of the pump Continually stepping the drive frequency to track the resonant mode can result in slight pulsatile flow, as the actuator impedance varies between steps, so does the drive power. One method to reduce the average pulsatile flow is to only track frequency when the measured impedance is higher than some threshold. In addition, a model of the actuator impedance curve can be used to calculate the expected impedance before a frequency step. The drive voltage is stepped at the same time as the frequency, to attempt to keep the power into the actuator constant. Each step provides updated information about the impedance curve, and this information is used to update the impedance curve model.

Figure 11:
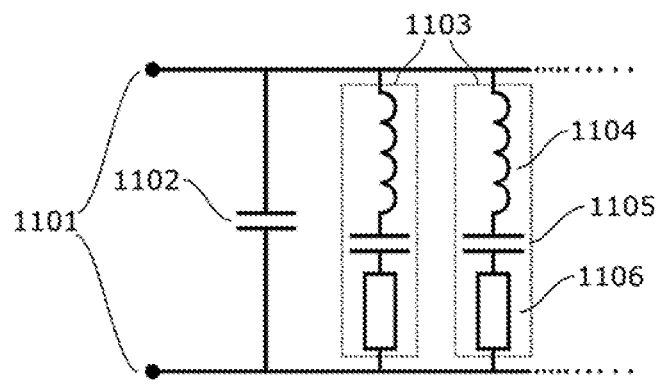
FIG. 11 schematically illustrates an electrical model of a piezoelectric actuator.

A piezoelectric device can be modelled with an electrical analogue. FIG. 11 illustrates an electrical model 1100 of a piezoelectric actuator. In the electrical model 1100, the parasitic parallel capacitance of the piezoelectric actuator is modelled as a parallel capacitor 1101. The piezoelectric resonant modes can be modelled as a series of parallel LCR circuits 1102. The inductor 1103, capacitor 1104 and resistor 1105 are electrical analogues of the physical inertia, spring constant and damping factor of a resonant mode. The impedance curve of the electrical model closely matches that of a real piezoelectric device.

The impedance curve shape near one resonant mode is not significantly affected by other resonant modes. Therefore, for one resonant mode, only 4 components of the electrical model (capacitor 1101 and resonant modes LCR circuit 1103, 1104 and 1105) strongly dictate the shape of the impedance curve.

Given the four unknown values of the simplified model, only four impedance measurements, each at a different frequency around where the resonant mode is expected, are needed to generate the impedance curve around the resonant mode.

Following from this, the minimum impedance point can be found with only four impedance measurements, rather than one for many frequency steps across the frequency range for the expected resonant mode. Further, if one or more of the simplified model values are found to remain reasonably constant (for example, the parallel capacitance does not vary significantly between piezoelectrics) then less impedance point measurements are required.

The electrical model 1100 shown in FIG. 11 indicates that the phase between the driving voltage and current consumed by a piezoelectric device is an indicator for how far, and in which direction, a resonant mode is. The driving frequency can therefore be periodically adjusted, so that the phase between the voltage and current matches a value which indicates that the driving frequency is on a resonant mode of the piezoelectric actuator.

Similarly, the phase between the driving voltage and signal from a sense section on a piezoelectric device is indicative of how far, and in which direction, a resonant mode is. The driving frequency can therefore be periodically adjusted so that the phase between the voltage and signal from the sense section matches a value which indicates that the driving frequency is on a resonant mode of the piezo.

When the power, and therefore the voltage, at which a piezoelectric device is driven changes, the frequency of the resonant modes shifts. In the case that the power is quickly ramped upwards or downwards, it is often challenging to track the frequency of the useful resonant mode. Instead, if the typical change in frequency is known for a given power increase or decrease, then the driving frequency can be changed by this amount during a given power increase or decrease. The typical values for frequency shifts versus power change may be stored in a lookup table.

Tracking the useful resonant mode of the piezoelectric actuator requires the actuator to be driven at a reasonable power while tracking, so that the electrical measurements required for tracking can be completed with the necessary precision. In some cases, it is beneficial to drive a disc pump at very low powers, where tracking the useful resonant mode is challenging. The shifts in frequency for the different resonant modes of the actuator are related to each other. Therefore, a shift in frequency of one resonant mode, indicates the shift in frequency in another mode. This means a resonant mode different to the useful one can be used to track frequency.

In one example, the useful resonant mode may be the first harmonic around 21 khz, and another resonant mode at the third harmonic around 63 kHz. A waveform comprising two frequency components is driven into the piezo, one to drive power into the first harmonic, the other into the third harmonic. The amplitude of the frequency component into the third harmonic is kept constant, and the third harmonics tracked frequency is tracked using one of the previously described techniques. The amplitude of the frequency component into the first harmonic can then vary as desired, and the frequency is kept at a constant ratio of the third harmonics frequency; in this case around one third.

While the piezoelectric actuator in a disc pump is most efficiently driven at the frequency of the useful resonant mode, the overall pump efficiency or greatest power output may not be at this frequency. This is because the acoustic resonances inside a disc pump interact with the resonant modes of the piezo. Therefore, in some cases, it is beneficial to set the drive frequency, based on the overall pump performance. The driving frequency is stepped upwards and downwards around the nominal frequency. At each step some performance indicator is measured or calculated, and the step frequency with the higher performance indicator, becomes the new nominal drive frequency. For instance, in one example, the performance indicator could be the flow per watt, the generated pressure from the pump per watt, or the actuator displacement per watt.

It can be beneficial to limit the power used to drive the piezoelectric actuator, for example to limit the possibility of damage to the piezoelectric actuator or other components. This can be achieved by a process comprising the following steps.

Firstly, the impedance of the piezoelectric actuator is calculated from the measured driving voltage and current. Secondly, the driving voltage that would result in driving the maximum power into the piezoelectric is calculated. Thirdly, the driving voltage is limited at or below the maximum calculated driving voltage.

As the piezoelectric impedance changes with driving frequency, pump back pressure, pump drive power and temperature, this process can be repeated periodically. The period between which the process is repeated depends upon the variation in the process, and typically varies between a minute and 100 microseconds. In addition, this process can be used to drive the piezoelectric actuator at a set power, by calculating the desired power (instead of the maximum power) in the second step, and then driving at the calculated voltage in the third step. Such a process can be carried out by a power control unit arranged between the power source and the DC to AC conversion unit. In other examples, the process is carried out internally within the DC to AC conversion unit, or by a power control unit positioned at a different location.

The invention claimed is:

1. A voltage driving apparatus for a portable fluid pump, comprising:
   a power source, arranged to provide a direct current;
   a DC gain unit electrically connected, in use, to receive a voltage from the power source and output an amplified voltage;
   a DC to AC conversion unit arranged, in use, to receive the amplified voltage from the DC gain unit and output a periodic waveform to drive a piezoelectric actuator in the portable fluid pump;
   the output periodic waveform comprising a first discrete voltage level and a second discrete voltage level, wherein each period of the waveform comprises the first voltage level for a first length of time and a second voltage level for a second length of time; and
   wherein a ratio of the first and second times at the first and second voltage levels is adjusted to produce a waveform having attenuated harmonics, and wherein the output waveform is modulated to further comprise in each period a third voltage level for a third length of time, after the first and second lengths of time, and wherein the second voltage level is higher than the first voltage level, and the third voltage level is between the first and second voltage levels.

2. The apparatus according to claim 1, wherein the DC gain unit further comprises a coupled inductor arranged such that, a first half of the coupled inductor is in series with the power source and a switching element and a second half of the coupled inductor is in series with a Schottky diode and the output of the DC gain unit.

3. The apparatus according to claim 1, wherein the DC gain unit is arranged to receive an input from a microcomputer unit to control the output voltage from the DC gain unit.

4. The apparatus according to claim 1, wherein the DC to AC conversion unit comprises MOSFETs, arranged to act as switching elements within either: a half-bridge arranged, in use, to switch between two voltages to output an alternating current; or an H-bridge, arranged to output an alternating current voltage with twice the voltage supplied to the DC to AC conversion unit.

5. The apparatus according to claim 1, further comprising at least one of: a direct current blocking circuit, comprising a blocking capacitance, arranged in use to filter out any direct current component of the output waveform; and a filter inductor, arranged in use to filter out high frequency content in the output waveform.

6. The apparatus according to claim 1, further comprising a power control unit arranged, in use, to determine a resonance characteristic of the fluid pump and selectively adjust the output waveform in response to the resonance characteristic.

7. The apparatus according to claim 6, wherein the resonance characteristic is determined using at least one of a voltage, a current, or a performance indicator of the fluid pump.

8. The apparatus according to claim 6, wherein the resonance characteristic is determined using a periodic calculation of impedance of the fluid pump.

9. The apparatus according to claim 8, wherein the power control unit is further arranged to calculate a first voltage required to drive the fluid pump at a selected first power.

10. The apparatus according to claim 9, wherein the selected first power is a desired set power and a driving voltage of the waveform is set equal to the first voltage.

11. The apparatus according to claim 9, wherein the selected first power is a maximum desired power and a driving voltage of the waveform is set equal to or less than the first voltage.

12. The apparatus according to claim 10, wherein the power control unit is further arranged to calculate a second voltage required to drive the pump at a selected second power, wherein the second power is a maximum desired power, and the driving voltage, calculated in response to the first power and first voltage, is modified to be equal to or less than the first voltage.

13. The apparatus according to claim 8, wherein the periodic calculation of the impedance of the fluid pump is based on a period of between 100 microseconds and 1 minute.

14. The apparatus according to claim 8, wherein the power control unit is arranged to adjust the output waveform to have a frequency equal to a frequency at which the periodically calculated impedance has a minimum value.

15. The apparatus according to claim 6, wherein the resonance characteristic is determined using a periodic measurement of current consumption of the fluid pump.

16. The apparatus according to claim 15, wherein the power control unit is arranged to adjust the output waveform to have a frequency equal to a frequency at which a periodically measured current consumption has a minimum value.

17. The apparatus according to claim 6, wherein the resonance characteristic is determined using a measured voltage output of a section of the piezoelectric actuator, said section of the piezoelectric actuator being disconnected from driven elements.

18. The apparatus according to claim 6, wherein the resonance characteristic is determined based on stepping the driving frequency of the output periodic waveform through a plurality of steps and measuring or calculating an overall pump performance indicator at each step.

19. The apparatus according to claim 18, wherein the pump performance indicator is one of flow per watt, generated pressure from the pump per watt, or actuator displacement per watt.

\* \* \* \* \*